US008891884B2

(12) United States Patent
Nowozin et al.

(10) Patent No.: US 8,891,884 B2
(45) Date of Patent: Nov. 18, 2014

(54) REGRESSION TREE FIELDS

(75) Inventors: Reinhard Sebastian Bernhard Nowozin, Cambridge (GB); Carsten Curt Eckard Rother, Cambridge (GB); Jeremy Martin Jancsary, Vienna (AT)

(73) Assignee: Microsoft Corporation, Redmond, WA (US)

( * ) Notice: Subject to any disclaimer, the term of this patent is extended or adjusted under 35 U.S.C. 154(b) by 292 days.

(21) Appl. No.: 13/337,324

(22) Filed: Dec. 27, 2011

(65) Prior Publication Data
US 2013/0163859 A1    Jun. 27, 2013

(51) Int. Cl.
*G06K 9/62* (2006.01)
*G06K 9/68* (2006.01)

(52) U.S. Cl.
USPC .......................................... 382/226; 382/159

(58) Field of Classification Search
CPC ... G06K 9/6282; G06K 9/00563; G06F 17/18
USPC .......................................................... 382/226
See application file for complete search history.

(56) References Cited

U.S. PATENT DOCUMENTS

| | | | |
|---|---|---|---|
| 6,009,199 A | 12/1999 | Ho | |
| 7,233,931 B2 | 6/2007 | Lee et al. | |
| 7,305,132 B2 | 12/2007 | Singh et al. | |
| 7,580,798 B2 | 8/2009 | Brunner et al. | |
| 7,702,596 B2 | 4/2010 | Tu et al. | |
| 7,840,059 B2 | 11/2010 | Winn et al. | |
| 2008/0075367 A1 | 3/2008 | Winn et al. | |
| 2008/0317331 A1 | 12/2008 | Winn et al. | |
| 2010/0094800 A1 | 4/2010 | Sharp | |
| 2010/0128984 A1 | 5/2010 | Lempitsky et al. | |
| 2010/0278384 A1 | 11/2010 | Shotton et al. | |
| 2011/0200230 A1 | 8/2011 | Luke et al. | |
| 2013/0166481 A1 | 6/2013 | Nowozin et al. | |

OTHER PUBLICATIONS

Wang, Qing Ren; Suen, C.Y., "Analysis and Design of a Decision Tree Based on Entropy Reduction and Its Application to Large Character Set Recognition," Pattern Analysis and Machine Intelligence, IEEE Transactions on , vol. PAMI-6, No. 4, pp. 406,417, Jul. 1984.*
N. Payet and S. Todorovic. "(RF)2—random forest random field". In Proc. NIPS. 2010. 1, 2.*
Charles Sutton, Andrew McCallum, "An Introduction to Conditional Random Fields", Submitted on Nov. 17, 2010.*

(Continued)

*Primary Examiner* — Utpal Shah
(74) *Attorney, Agent, or Firm* — Steve Wight; Judy Yee; Micky Minhas

(57) ABSTRACT

A new tractable model solves labeling problems using regression tree fields, which represent non-parametric Gaussian conditional random fields. Regression tree fields are parameterized by non-parametric regression trees, allowing universal specification of interactions between image observations and variables. The new model uses regression trees corresponding to various factors to map dataset content (e.g., image content) to a set of parameters used to define the potential functions in the model. Some factors define relationships among multiple variable nodes. Further, the training of regression trees is scalable, both in the training set size and in the fact that the training can be parallelized. In one implementation, maximum pseudolikelihood learning provides for joint training of various aspects of the model, including feature test selection and ordering (i.e., the structure of the regression trees), parameters of each factor in the graph, and the scope of the interacting variable nodes used in the graph.

19 Claims, 6 Drawing Sheets

(56) References Cited

OTHER PUBLICATIONS

Liao, et al., "Training Conditional Random Fields using Virtual Evidence Boosting", Retrieved at <<http://ijcai.org/Past%20Proceedings/IJCAI-2007/PDF/IJCAI07-407.pdf>>, Proceedings of the International Joint Conference on Artificial Intelligence (IJCAI), 2007, pp. 2531-2535.

Kumar, et al., "Discriminative Random Fields: A Discriminative Framework for Contextual Interaction in Classification", Retrieved at <<http://www-2.cs.cmu.edu/~skumar/application/DRF.pdf>>, IEEE International Conference on Computer Vision (ICCV), Oct. 13-16, 2003, vol. 2, pp. 1150-1157.

Boyd, Stephen, "Convex Optimization", Retrieved at <<http://homes.esat.kuleuven.be/~optec/events/STEVIN_boyd.pdf>>, Apr. 18, 2007, pp. 53.

Geman, et al., "Stochastic Relaxation, Gibbs Distributions and the Bayesian Restoration of Images", Retrieved at <<http://www.cis.jhu.edu/publications/papers_in_database/GEMAN/GemanPAMI84.pdf>>, IEEE Transactions on Pattern Analysis and Machine Intelligence, Oct. 7, 1983, No. 6, pp. 721-741.

Kirkpatrick, et al., "Optimization by Simulated Annealing", Retrieved at <<http://www.fisica.uniud.it/~ercolessi/MC/kgv1983.pdf>>, Journal: Science, vol. 220, No. 4598, May 13, 1983, pp. 671-680.

Maron, et al., "Hoeffding Races: Accelerating Model Selection Search for Classification and Function Approximation", Retrieved at <<http://citeseer.ist.psu.edu/viewdoc/download;jsessionid=B036A2745E1AEC32B5402690526C4324?doi=10.1.1.10.7504&rep=rep1&type=pdf>>, Conference: Neural Information Processing Systems—NIPS, 1994, pp. 59-66.

Mason, et al., "Boosting Algorithms as Gradient Descent", Retrieved at <<http://www.cs.cmu.edu/Groups/NIPS/NIPS99/99papers-pub-on-web/Named-gz/MasonBaxterBartlettFrean.ps.gz>>, pp. 7, 1999.

Nowozin, et al., "Tutorial Draft: Structured Learning and Prediction in Computer Vision", Retrieved at <<http://www.nowozin.net/sebastian/papers/DRAFT-structured.pdf>>, Foundations and Trends® in Computer Graphics and Vision, vol. 6, No. 3-4, pp. 185-365, 2011.

Dietterich, et al., "Training Conditional Random Fields via Gradient Tree Boosting", Retrieved at <<http://citeseer.ist.psu.edu/viewdoc/download;jsessionid=F75466AB212213536B42858BD0A0F605?doi=10.1.1.58.6703&rep=rep1&type=pdf>>, Proceedings of the twenty-first international conference on Machine learning (ICML), 2004, pp. 217-224.

Alahari, et al., "Efficient Piecewise Learning for Conditional Random Fields", Retrieved at <<http://www.di.ens.fr/~alahari/papers/alahari10a.pdf>>, IEEE Conference on Computer Vision and Pattern Recognition (CVPR), Jun. 13-18, 2010, pp. 895-901.

Dobra, Alin, "Classification and Regression Tree Construction", Retrieved at <<http://citeseerx.ist.psu.edu/viewdoc/download?doi=10.1.1.84.843&rep=rep1&type=pdf>>, Nov. 25, 2002, pp. 1-18.

Wainwright, et al., "Graphical Models, Exponential Families, and Variational Inference", Retrieved at <<http://www.eecs.berkeley.edu/~wainwrig/Papers/WaiJor08_FTML.pdf>>, Foundations and Trends in Machine Learning, vol. 1, No. 1-2, 2008, pp. 1-305.

Bertsekas, Dimitri P., "Nonlinear Programming", Retrieved at <<http://lawww.epfl.ch/webdav/site/la/shared/import/migration/IC_32/ic-32_lectures-1-8.pdf>>, Athena Scientific, Danskin's theorem, Sep. 1999, pp. 1-60.

Birgin, et al., "Nonmonotone Spectral Projected Gradient Methods on Convex Sets", Retrieved at <<http://citeseerx.ist.psu.edu/viewdoc/download?doi=10.1.1.67.1456&rep=rep1&type=pdf>>, SIAM Journal on Optimization, vol. 10, No. 4, Jun. 7, 1999, pp. 1-20.

Schmidt, et al., "Optimizing Costly Functions with Simple Constraints: A Limited-memory Projected Quasi-newton Algorithm", Retrieved at <<http://jmlr.csail.mit.edu/proceedings/papers/v5/schmidt09a/schmidt09a.pdf>>, Proceedings of the 12th International Conference on Artificial Intelligence and Statistics (AISTATS), 2009, pp. 456-463.

Wallach, Hanna M., "Conditional Random Fields: An Introduction", Retrieved at <<http://www.inference.phy.cam.ac.uk/hmw26/papers/crf_intro.pdf>>, University of Pennsylvania, CIS Technical Report, Report No. MS-CIS-04-21, Feb. 24, 2004, pp. 1-9.

U.S. Appl. No. 13/337,309, "Amendment and Response to Office Action", filed Jan. 20, 2014, pp. 1-20.

Nowozin, et al., "Structured Learning and Prediction in Computer Vision", Retrieved at <<http://www.nowozin.net/sebastian/papers/nowozin2011structured-tutorial.pdf>>, 2011, pp. 1-178.

U.S. Appl. No. 13/337,309, "Office Action dated Oct. 25, 2013", pp. 1-34.

Shotton, et al., "Semantic Texton Forests for Image Categorization and Segmentation", IEEE Conference on Computer Vision and Pattern Recognition, 2008, pp. 1-8.

Nowozin, et al., "Decision Tree Fields", 2011 IEEE International Conference on Computer Vision, 2011, pp. 1668-1675.

Nowozin, et al., "Decision Tree Fields Poster", Microsoft Research Cambridge, pp. 1-2, 2011.

Nowozin, et al., "Decision Tree Fields Slides", Barcelona, Nov. 8, 2011, pp. 1-81.

Nowozin, et al., "Supplementary Material: Decision Tree Fields", 2011 IEEE International Conference on Computer Vision, 2011, pp. 1-7.

* cited by examiner

REGRESSION TREE FIELDS

The present application is related to U.S. patent application Ser. No.13/337,309, entitled "Discriminative Decision Tree Fields" and filed concurrently herewith, specifically incorporated by reference herein for all that it discloses and teaches.

BACKGROUND

The task of labeling or classifying unknown data to a set of known data arises in many fields, including computer vision, bioinformatics, computational linguistics, and speech recognition. For example, given an image comprising individual pixels, each pixel may be labeled as either foreground or background. Alternatively, each pixel may be labeled as being a member of the set of pixels belonging to one object or another object in the image. Other labeling applications are contemplated.

Probabilistic graphical models have emerged as a tool for building computer vision models. Conditional Random Fields (CRFs) represent a powerful class of models for labeling problems. In one view, CRFs provide a probabilistic framework for labeling and segmenting sequential data based on a model that defines a conditional probability $p(y|x)$ over labels y given a particular observation x. For example, such conditional models may be used to label an unknown pixel x by selecting the label y that maximizes the conditional probability $p(y|x)$. However, existing models for implementing accurate CRFs have generally proven intractable.

SUMMARY

Implementations described and claimed herein address the foregoing problems by providing a new tractable model for solving labeling problems using regression tree fields, which represent non-parametric Gaussian conditional random fields. Regression tree fields are parameterized by non-parametric regression trees, allowing universal specification of interactions between image observations and variables. The new model uses regression trees corresponding to various factors to map dataset content (e.g., image content) to a set of parameters used to define the potential functions in the model. Some factors define relationships among multiple variable nodes. Further, the training of regression trees is scalable, both in the training set size and in the fact that the training can be parallelized. In one implementation, maximum pseudolikelihood learning provides for joint training of various aspects of the model, including feature test selection and ordering (i.e., the structure of the regression trees), parameters of each factor in the graph, and the scope of the interacting variable nodes used in the graph.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

There are three challenges relating to the use of probabilistic graphical models to solve computer vision (and other) tasks: parameterization, learning, and inference. Parameterization represents the specification of a model structure and its related parameters. Learning represents the estimation of model parameters from training data. Inference represents the test-time task of reasoning about the state of the variables of interest, given an unlabeled dataset (e.g., labels on individual pixels in an unlabeled image). In a computer vision example, various labeling scenarios may involve labeling individual pixels with specific properties, such as either foreground or background, as belonging to one object or another, and/or as being part of one body part or another. Each label can identify a property associated with the pixel.

Figure 1:
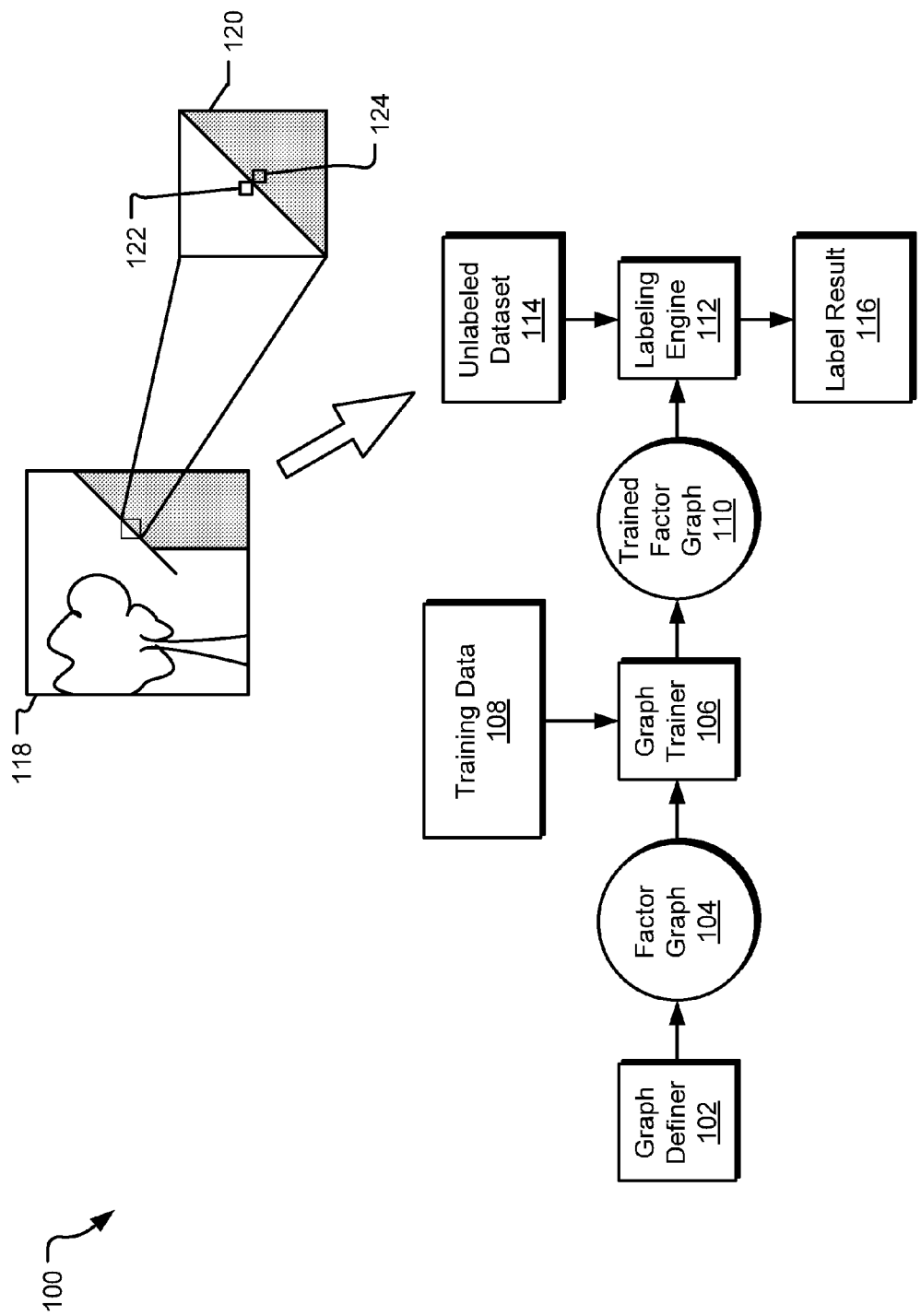
FIG. 1 illustrates an example labeling system for labeling observations using discriminative regression tree fields.

FIG. 1 illustrates an example labeling system 100 for labeling observations using discriminative regression tree fields. A graph definer 102 creates a factor graph 104 from a set of replicated factor graph models, wherein each factor is defined as a regression tree. The graph definer 102 replicates the factor graph model corresponding to each node of the factor graph 104. Each node of the factor graph 104 corresponds to an element (e.g., a pixel) of a dataset x (e.g., an image), where x represents a dataset with the set of all possible datasets ($x \in X$) (e.g., an image in the set of all possible images). As discussed below, the factor graph 104 includes at least one multi-dimensional factor, such as a pairwise factor defining a relationship between two neighboring pixels in an image or a higher order factor defining relationships among more than two neighboring pixels in an image. It should be understood that neighboring pixels may be sparsely distributed and need not be adjacent to one another. The factor graph 104 may also include unary factors (i.e., a factor dependent on only one variable node). Each factor informs the labeling of properties for one or more variable nodes in the factor graph 104.

A graph trainer 106 receives training data 108, such as a set of known (e.g., previously labeled) images. For example, if the labeling system 100 is used to segment different objects within an image, the training data 108 may include a number of images in which various objects have already been labeled. As such, the training data 108 includes training datasets and the associated labeling information. The graph trainer 106 uses the training data 108 to convert the untrained factor graph 104 into a trained factor graph 110 in which the structure of the regression trees, the parameterization for each factor, and the structure of the factor graph model replicated for each factor has been determined. The factors contribute to a potential function (e.g., an energy function) for each variable node and therefore to the labeling of the dataset element associated with that variable node.

A labeling engine 112 receives the trained factor graph 110 and an unlabeled dataset 114 (such as an unlabeled image 118). The labeling engine 112 applies the trained factor graph 110 to the dataset 114 to generate a labeled result 116. In the example of the unlabeled image 118, the labeling engine 112 attempts to accurately label pixels (such as pixels 122 and 124) according to an object or region within the image 118.

For example, as shown in a magnified view 120, the pixel 124 could properly be labeled as a pixel within the building structure and the pixel 122 could properly be labeled as a pixel within the background.

The described technology may be applied to other types of labeling within different types of datasets, including without limitation body part identification within a depth map, character recognition, voice recognition, biological sample identification, etc.

In yet another implementation, the described technology can be applied to de-noising (e.g., inpainting pixels within text characters, such Chinese language characters). In such an implementation, a one-dimensional continuous problem is encoded as $\{[1,0],[0,1]\}$. Further, the described technology may be extended to encode a discrete label having m states with an m-dimensional orthogonal basis.

Figure 2:
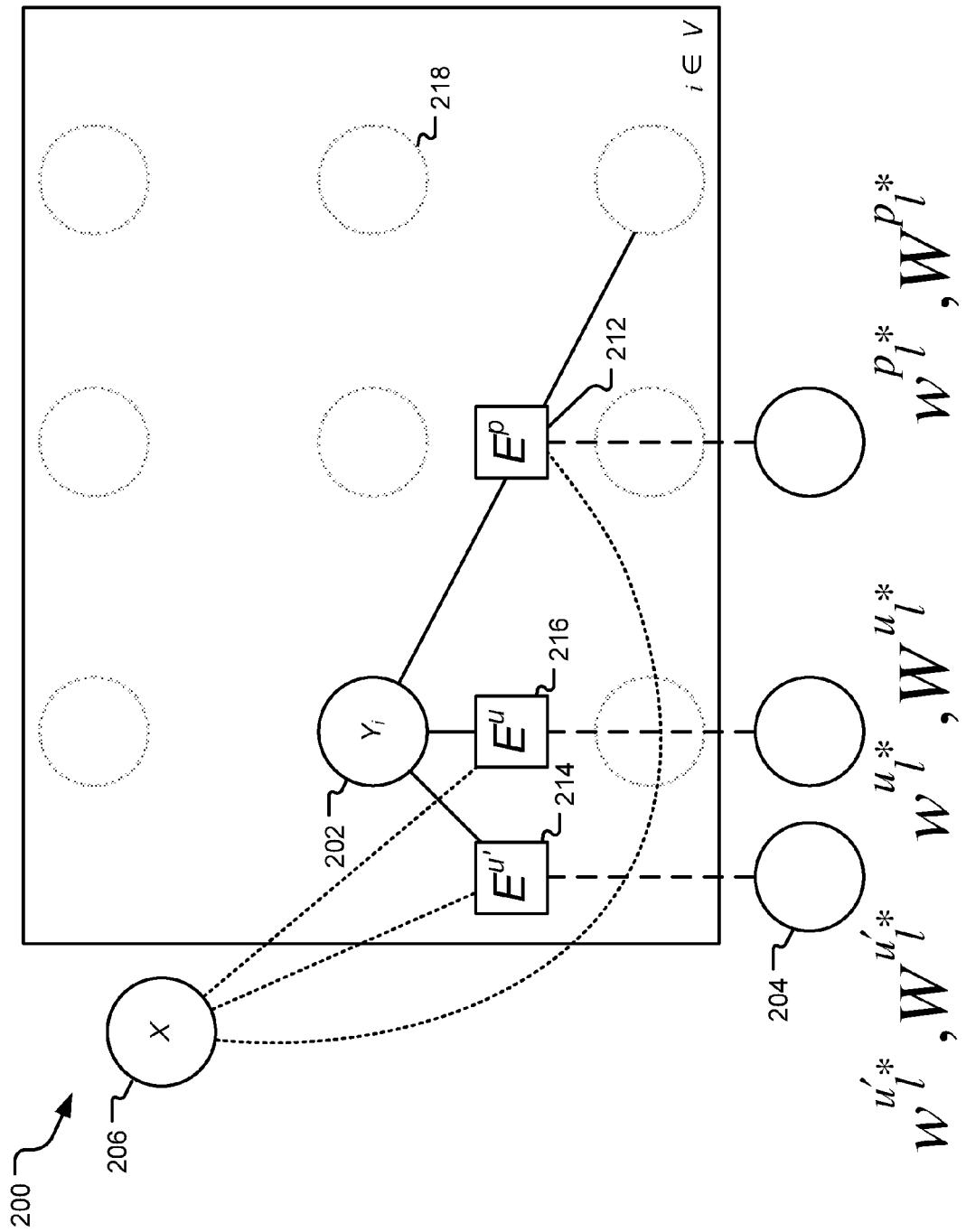
FIG. 2 illustrates an example factor graph model for labeling observations using discriminative regression tree fields.

FIG. 2 illustrates an example factor graph model 200 for labeling observations using discriminative regression tree fields. The factor graph model 200 is replicated for each variable node within the factor graph corresponding to a given variable node (e.g., an unlabeled pixel). The notation employed in the factor graph model 200 can be used to define an energy function for labeling observations. A factor graph model 200 represents a tuple (V, F, E), where V represents the set of all unobserved variable nodes (such as unobserved variable node 202), F represents the set of all factor nodes (such as factor nodes 212, 214, and 216), and E represents the set of all edges, such that $E \subseteq V \times F$. As such, the factor graph model 200 is replicated once for each variable node (e.g., each pixel of an image) where V represents the set of all unobserved variable nodes (such as unobserved variable node 202). A observed node 206 represents an observed dataset x (e.g., an image) from a set of possible images X, such that $x \in X$. To infer a joint continuous labeling $y \in Y$ (e.g., one for each pixel, where Y represents the set of all possible labels, $y_i \in \Re^m$, with $y = \{y_i\}_{i \in V}$, where V denotes the set of all data set elements (e.g., pixels in the image).

In FIG. 2, the factor graph model 200 includes two unary factor types (of factor nodes 214 and 216) and one pairwise factor type (of factor node 212). All factors depend on the data of the dataset x (e.g. an image). The basic factor graph model 200 is replicated for each additional variable node (e.g., see variable node 218), where $i \in V$, although such replications are not shown in FIG. 2.

Building on the notation described above and using an image processing context, $x \in X$ defines a given observed image x of a set of all possible images X. Accordingly, an implementation of a labeling process infers a discrete label for variable y of a set of all variables Y (i.e., $y \in Y$), where the labeling is on a per-pixel basis and $y = (y_i)_{i \in V}$ and $y_i \in L$ (all variables have the same label set L). The relationship between x and y is defined by a quadratic energy function E:

$$E(y,x,W) = \tfrac{1}{2}\langle\!\langle yy^T, \Theta(x,W)\rangle\!\rangle - \langle y, \theta(x,W)\rangle \qquad (1)$$

where W denotes the parameters of the graph model 200, which determine the vector $\theta(x, W) \in \Re^{m|V|}$ and the positive-definite matrix $\Theta(x, W) \in S_{++}^{m|V|}$. (Here, $\langle\!\langle .\rangle\!\rangle$ denotes a Frobenius inner product, e.g., $\langle\!\langle yy^T, \Theta\rangle\!\rangle = y^T\Theta y$.) These parameters represent the canonical parameters of the corresponding m|V|-dimensional Gaussian density $$p(y|x;W) \propto \exp\{-E(y,x,W)\} \qquad (2)$$

in which $\Theta(x, W)$ plays the role of the inverse covariance of precision matrix and is typically sparse. The energy can be decomposed into a sum over local energy terms, or factors, over single variable nodes i and pairs of variable nodes (i,j).

Energy terms are grouped into factors of common unary type $u \in U$ or pairwise type $p \in P$ that share the same energy function $E^u$ or $E^p$, but act on different variables and image content. Thus Equation (1) becomes $$E(y, x, W) = \sum_{u, i \in V^u} E^u(y_i, x, W) + \sum_{p,(i,j) \in E^p} E^p(y_{ij}, x, W)$$

where $V^u$ and $E^p$ denote sets of single variable nodes i and pairs of variable nodes (i,j) covered by a unary factor of type u or a pairwise factor of type p, respectively. The factors of a type are instantiated in a repetitive manner relative to each pixel, specified in terms of offsets of the factor variables.

The local energy function $E^u$ associated with a unary factor type is of the form $$E^u(y_i, x, W) = \tfrac{1}{2}\langle\!\langle y_i y_i^T, \Theta_i^u(x,W)\rangle\!\rangle - \langle y_i, \theta_i^u(x,W)\rangle$$

while a pairwise factor type p assigns $y_{ij} \in \Re^{2m}$ a similar energy $E^p$ defined as $$E^p(y_i, x, W) = \tfrac{1}{2}\langle\!\langle y_{ij}y_{ij}^T, \Theta_{ij}^p(x,W)\rangle\!\rangle - \langle y_{ij}, \theta_{ij}^p(x,W)\rangle$$

The local canonical parameters $\{\theta_i^u, \Theta_i^u\}$ and $\{\theta_{ij}^p, \Theta_{ij}^p\}$ can in principle depend on x in an almost arbitrary manner: the observed data determines the local Gaussian model that is in effect. The global matrix $\Theta(x,W)$ stays positive-definite so that Equation (2) remains a valid distribution, which can be achieved by setting $\theta_i^u(x,W) = w^u \in \Re^m$ and $\Theta_i^u(x,W) = W^u \in S_{++}^m$ (and similarly for the pairwise terms), resulting in a set of model parameters $W = \{w^u, W^u, w^p, W^p\}_{u \in U, p \in P}$. It should be understood that $S_{++}^m$ represents the set of all positive definite matrices.

However, in an alternative implementation, a valid non-parametric map from x to valid local models can be realized using regression trees. To determine the parameterization of the unary local energy terms in a context-dependent manner. The parameters of a quadratic energy $$E^u(y_i) = \tfrac{1}{2}\langle\!\langle y_i y_i^T, W^{ul}\rangle\!\rangle - \langle y_i, w^{ul}\rangle, \text{ with } W^{ul} \in S_{++}^m.$$

For a selected leaf node to determine the parameterization of the local energy terms of a conditional random field, viz.:

$$\theta_i^u(\bullet) \text{ and } \Theta_i^u(\bullet) = W^{ul*}, l^* = \text{Leaf}(u,i,x).$$

As such, a regression tree is associated with each unary factor u, each regression tree determining parameterization of a unary energy term in the manner described above.

Parameterization of a pairwise energy term is determined in a similar manner. A regression tree is associated with each pairwise factor type p, the regression tree being defined over pairs of variable nodes (i,j) (e.g., corresponding to pixels in an image) and having leaves that store 2m-dimensional models $$E^{pl}(y_{ij}) = \tfrac{1}{2}\langle\!\langle y_{ij}y_{ij}^T, W^{pl}\rangle\!\rangle - \langle y_{ij}, w^{pl}\rangle, \text{ with } W^{pl} \in S_{++}^m$$

with $\theta_{ij}^p(x,W)$ and $\Theta_{ij}^p(x,W)$ defined to return the parameters of the selected leaf node l*. The collection of all model parameters is thus given by all parameters residing at the leaves of the regression trees, $W = \{w^{ul}, W^{ul}, w^{pl}, W^{pl}\}$.

In one implementation, individual factors are repeated for a given dataset, such as an image. For example, the factors and the associated weight vectors are replicated for multiple pixels in a pixel grid. However, the evaluation of the individual regression tree for each factor is based on each pixel of interest, thereby resulting on an energy value for each variable node that specifically characterizes the particular variable node of interest.

Figure 3:
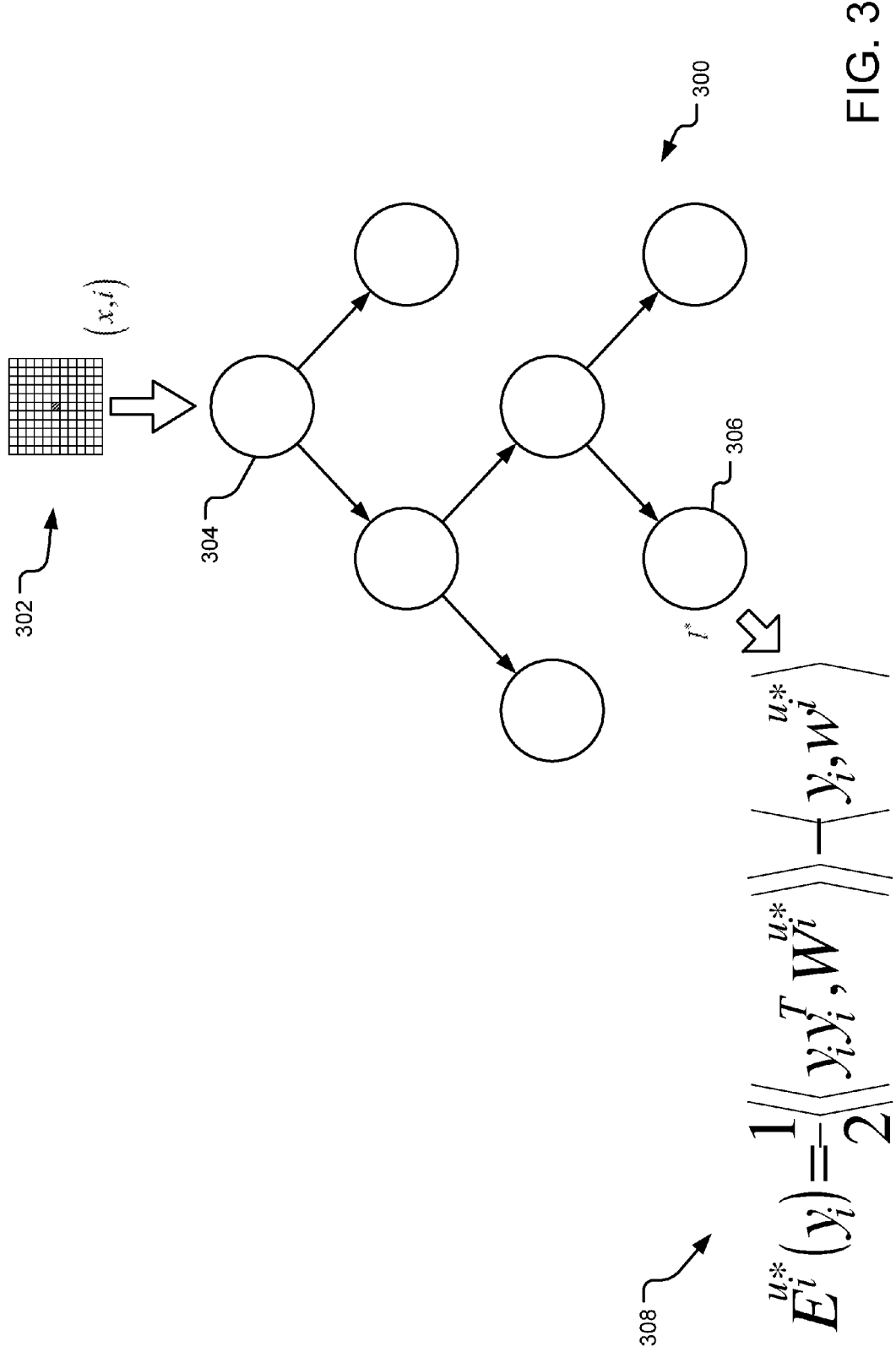
FIG. 3 illustrates an example regression tree for a factor type u.

FIG. 3 illustrates an example regression tree 300 for a unary factor type. The regression tree 300 has four leaf nodes and therefore four parameters corresponding to four labels ($|y_F|=4$). The parameters at each leaf node include the mean vector and the matrix and further depend on the content of the dataset 302 (x), which is represented in FIG. 3 as an 11×11 patch of an image centered on a pixel i of interest. The energy function of leaf node 306 is given in equation 308.

Figure 4:
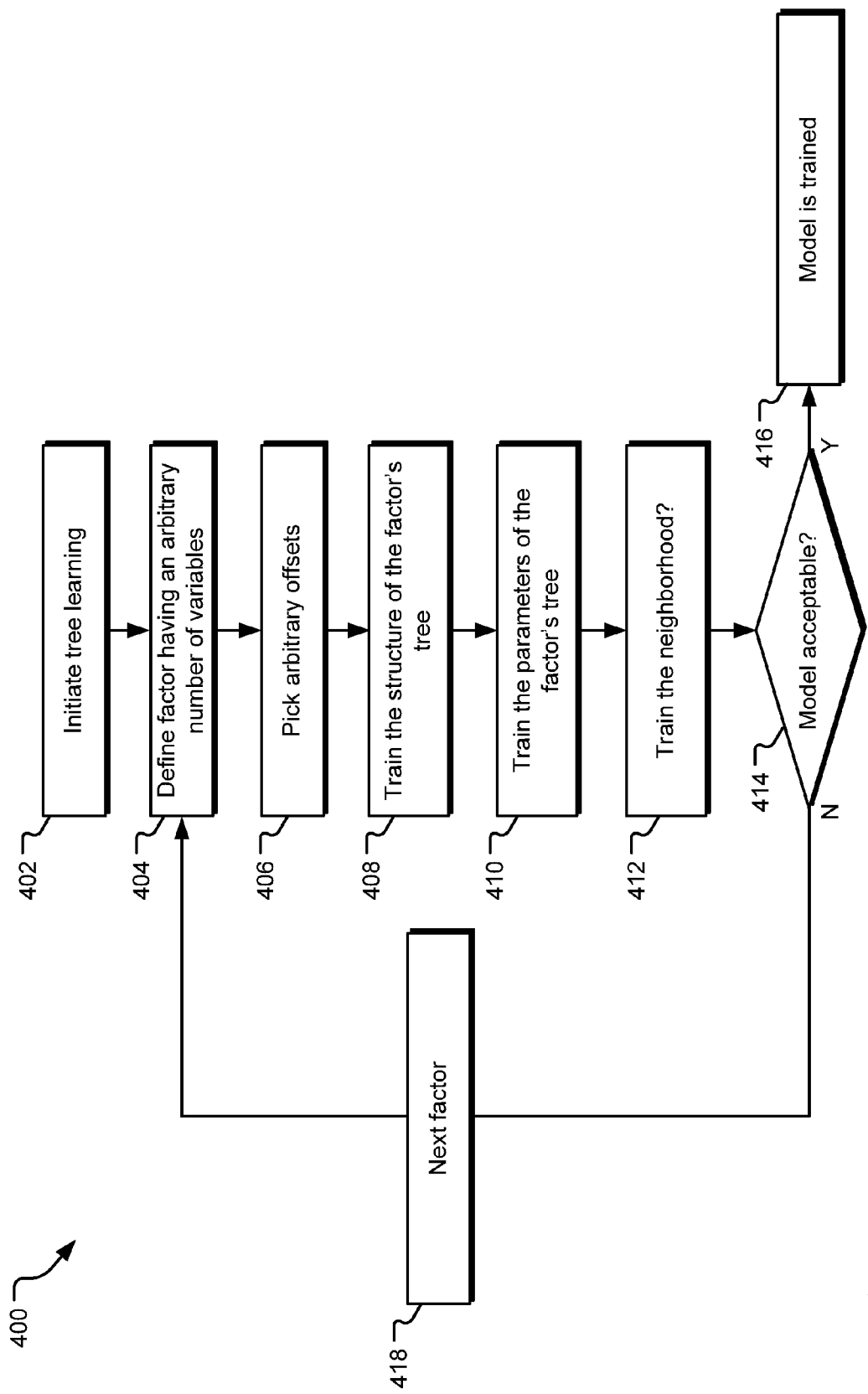
FIG. 4 illustrates example operations for training discriminative regression tree fields.

FIG. 4 illustrates example operations 400 for training discriminative regression tree fields. In principle, the non-parametric nature of regression trees allows for learning arbitrary mappings from input images $x \in X$ to labelings $y \in Y$. One implementation of the described technology employs an arbitrary linear model in each leaf node of a regression tree using a set of application-dependent basis functions to provide such mappings, although other implementations may be employed.

Basis functions $\{\phi^b\}_{b \in B}$ can be readily employed in such an arbitrary model, and the basis functions can depend on x and the position within the image in an arbitrary manner. For example, in the energy term $E^u$ of a unary factor at pixel I, the linear term $\langle y_i, w^{u_i*} \rangle$ can be replaced by $\Sigma_b \phi^b(i,x) \langle y_i, w^{u_i,b} \rangle$. As a consequence, each leaf l of the regression tree stores not only a single parameter vector $w^{u_i} \in \Re^m$, but also a collection of vectors $\{w^{u_i,b}\}_{b \in B}$, where again $w^{u_i} \in \Re^m$.

The global energy function $E(y,x,W)$ is in quadratic form. As such, the minimizing labeling can be found in closed form:

$$y^* = [\Theta(x,W)]^{-1}\theta(x,W),$$

which is also the mean of the associated Gaussian density and solves the linear system $\Theta(x,W)y=\theta(x, W)$. Using the iterative conjugate gradient (CG) method provides a solution to a residual norm of $10^{-4}$. (It should be understood that other values of residual norms may be employed.) The convergence behavior of CG can be directly controlled by bounding the eigenvalues of the learned inverse covariance matrices.

The operations 400 are described with regard to training an image labeling system, but other applications, systems, and datasets are also contemplated. Given an arbitrary factor graph model, such as the example described with regard to FIG. 2 or some variation thereof, each factor includes a regression tree. The operations 400 may be applied to iteratively train each regression tree, including its structure and the parameters. Moreover, the factor graph model itself may be refined to define an effective scope of the neighbors included in the factor graph model.

An initial operation 402 starts the tree learning process, starting with an initial factor and its corresponding regression tree (e.g., TreeNumber=1). A defining operation 404 defines the factor to include an arbitrary number of variables. An offset operation 406 assigns arbitrary offsets to each variable (typically, the first variable in the tree is assigned the offset (0,0)).

The offset operation 406 is followed by a sequence of training operations 408, 410, and 412, which use an independent and identically distributed (iid) random training set $$D = \{(x^{(p)}, y^{(p)})\}_{p=1}^P.$$

In an image processing example, the training set may be treated as a single collection of labeled pixels (x,y). The training operation 408 trains the regression tree for the current factor to determine the structure of the regression tree, which may be characterized by the selection and ordering of the feature tests within the regression tree and depth of the regression tree. In one implementation, the training operation 408 selects the feature tests for each node in the regression tree using a reduction of variance criterion and then associates a quadratic model with each leaf, as shown and described with regard to in FIG. 3. Then a next node in the regression tree is selected recursively until the feature test at each node in the regression tree is fixed. The recursion continues until the unused training samples are exhausted, the number of used training samples increases above a predefined recursion threshold, or the number of unused training samples falls beneath a predefined recursion threshold. The resulting regression tree, as characterized by its depth, its feature tests, and the order thereof.

Having determined the structure of the regression tree at the current factor, the training operation 410 initializes the parameters of the regression trees (e.g., sets them to zero) and trains the parameterization of the regression tree for the current factor using an objective function, such as by optimizing a pseudolikelihood estimation. Training each factor's regression tree can involve selecting the neighborhood structure applied to the regression tree, the structure of the regression tree, and the parameters (e.g., weights) stored in the regression tree nodes. The training operation 410 estimates the parameters w of the regression tree for the current factor. In this description, the set of images x are treated as one large collection of pixels, although other contexts may be employed.

The training operation 410 uses an objective function to determine the parameters of the regression tree. In one implementation, the objective function is in the form of a maximum likelihood estimate (MLE). In another implementation, the objective function is in the form of a tractable pseudolikelihood that defines a surrogate likelihood that is maximized or an approximate maximum likelihood. The maximized pseudolikelihood estimation (MPLE) is defined as:

$$W_{MPLE} = \text{argmin}_{W \in \Omega} -\Sigma_{i \in V} \log p(y_i | y_{V \setminus i}, x, W). \qquad (3)$$

Notably, the objective decomposes into likelihoods of single pixels, condition on the observed properties of the other pixels, $$p(y_i | y_{V \setminus i}, x, W) = \frac{\exp(-E(y_i, y_{V \setminus i}, x, W))}{\int \exp(-E(\hat{y}_i, y_{V \setminus i}, x, W)) d\hat{y}_i}.$$

The conditioned subgraphs are m-dimensional Gaussians, so the energy of a property $y_i$ of a conditioned subgraph in canonical form can be written as:

$$E(\bullet) = \frac{1}{2} \langle\!\langle y_i y_i^T, \Theta_i(x,W) \rangle\!\rangle - \langle y_i, \theta_i(y_{V \setminus i}, x, W) \rangle.$$

The canonical parameters $\Theta_i(\bullet) \in \Re^m$ depend on the properties $y_{V \setminus i}$ of the pixels on which the subgraph conditions. The corresponding mean parameters $\mu_i$ and $\Sigma_i$ are computed analogously to mean parameters in the MLE case:

$$\mu^{def} = E_{y \sim p(y|x,W)}[y] \text{ and } \Sigma^{def} = E_{y \sim p(y|x,W)}[yy^T]$$

The mean parameters may be used to derive the gradient with respect to the actual model parameters via the chain rule. The general form of the gradient is given as $$-\log p(y_i | y_{V \setminus i}, x, W) = E(y_i, y_{V \setminus i}, x, W) + \log \int_{\Re^m} \exp(-E(\hat{y}_i, y_{V \setminus i}, x, W)) d\hat{y}_i, \text{ and}$$

$$\nabla_W [-\log p(y_i | y_{V \setminus i}, x, W)] = \nabla_W E(y_i, y_{V \setminus i}, x, W) - E_{\hat{y}_i \sim p(\hat{y}_i | y_{V \setminus i}, x, W)} [\nabla_W E(\hat{y}_i, y_{V \setminus i}, x, W)].$$

where E represents "expectation," the weighted sum over all elements. Note that Equation (3) is convex and can be solved efficiently using projected gradient methods at a complexity of $O(m^3|V|)$ per computation of the gradient, which can be parallelized over the set of pixels V.

In one implementation, a form of regularization may be employed for the matrix parameters of the RTF model. In this implementation, the eigenvalues of $\{W^{ui}, W^{pi}\}$ can be upper-bounded to be larger than a large positive number $\bar{\epsilon}$ and lower-bounded to be no smaller than a tiny positive number $\underline{\epsilon}$. The set of matrices that fulfill these constraints is again convex. Through this restriction, a favorable condition number of $\Theta(x, W)$ can be enforced, leading to fast convergence of the conjugate gradient method at test-time. Moreover, by adjusting $\bar{\epsilon}$, the local models may be pushed to be less certain of their mean, effectively regularizing the model. The matrices remain in this constrained set when a projection operator that finds, for any given matrix, the closest matrix in Frobenius sense that satisfies the eigenvalue constraints.

In an alternative implementation, the structure training operation 408 and the parameter training operation 410 may be performed jointly, rather than sequentially. In one such implementation, splits are chosen to lead to the largest increase in the projected gradient norm $\|P_\Omega(\nabla W')\|$, where $W'=(W\backslash W^{t_p})\cup(W^{t_l}\cup W^{t_r})$ denotes the model parameters after the split, with the parameters $W^{t_l}$ and $W^{t_r}$ of the newly introduced children l and r initialized to the previous parameters $W^{t_p}$ of the leaf p that was split. Here, t refers to either a unary or a pairwise type.

The gradient norm with respect to model parameters $W^{t_l}=\{w^{t_l}, W^{t_l}\}$ of a given leaf l can be thought of as a measure of disagreement between the mean parameters $\{\mu_i(x,W), \Sigma_i(x,W)\}$ and the empirical distribution of $\{y_i, y_i y_i^T\}$ in the conditioned subgraphs affected by the leaf. The criterion can be biased toward spits introducing new parameters relevant to those subgraphs where the disagreement is largest, as these are most likely to achieve significant gains in terms of pseudo-likelihood, although other configurations may be employed.

An example operation for joint learning of regression tree structure and parameters may be described as follows:
1. Start with trees consisting of root nodes
2. Repeat the following
   a. Optimize or re-optimize parameters of the current leaf nodes
   b. For each conditioned subgraph i,
      i. Pre-compute mean parameters $\mu_i, \Sigma_i$
   c. For each factor type t an its tree,
      i. For each conditioned subgraph i,
         1. For each factor of matching type,
            a. Compare gradient contribution via $\mu_i, \Sigma_i$
            b. Sort contribution into target leave
      ii. For each leaf p,
         1. Find split $(f,\epsilon)$ maximizing $\|P_\Omega(\nabla W')\|$
         2. Split node p into new child leaves (l, r)
         3. Set $W^{t_l} \leftarrow W^{t_p}$ and $W^{t_p} \leftarrow W^{t_p}$
3. Until maximum regression tree depth is reached
4. Optimize parameters of leaf nodes to final accuracy Yet another training operation 412 determines the scope of the neighborhood around any pixel of interest that is to be included in the factor graph model. In one implementation, a set of candidate interactions is proposed at random, and their weights are initialized to zero. For each candidate interaction, the potential decrease in the learning objective is assessed by measuring the norm of the gradient of the respective weights of this interaction. The larger this norm, the more likely the interaction is going to help in reducing the learning objective function. Accordingly, candidate interactions having gradient norms satisfying an interaction condition (e.g., exceeding a predefined threshold) are retained, while those having gradient norms that do not satisfy the interaction condition are not retained.

A decision operation 414 manages the iterations within the learning processes. In one implementation, the decision operation 414 determines how much the objective function has decreased with regard to the previous iteration. If the decrease does not satisfy an acceptance condition (e.g., is not below an acceptance threshold), then an iteration operation 418 moves to a new factor and continues processing at the defining operation 404. Otherwise, the model is deemed trained at operation 416.

In one implementation, the learning process iterates through all trees in the factor graph model until each factor's regression tree is optimized (after which the learning process terminates at operation 416.

Figure 5:
FIG. 5 illustrates example operations for labeling observations using discriminative regression tree fields.

FIG. 5 illustrates example operations 500 for labeling observations using discriminative regression tree fields to infer labeling. A defining operation 502 defines in storage (such as computer memory) the form of the factor graph model for each variable node (e.g., corresponding each pixel in an image). A training operation 504 trains the factor graph, such as using the training processed described with regard to FIG. 4.

An inference operation 506 receives an unlabeled dataset (such as an unobserved image) and applies the factor graph to each element (e.g., pixel) in the dataset. During the inference operation 506, each dataset element is associated with a variable node of a replicated factor graph model in the factor graph. The inference operation 506 executes the factor graph model on each dataset element (e.g., pixel), determining and summing $E^u$ and $E^p$ factors for each dataset element to determine the labeling that minimizes $E(y,x,W)$. That labeling is assigned to the data elements of the dataset.

Figure 6:
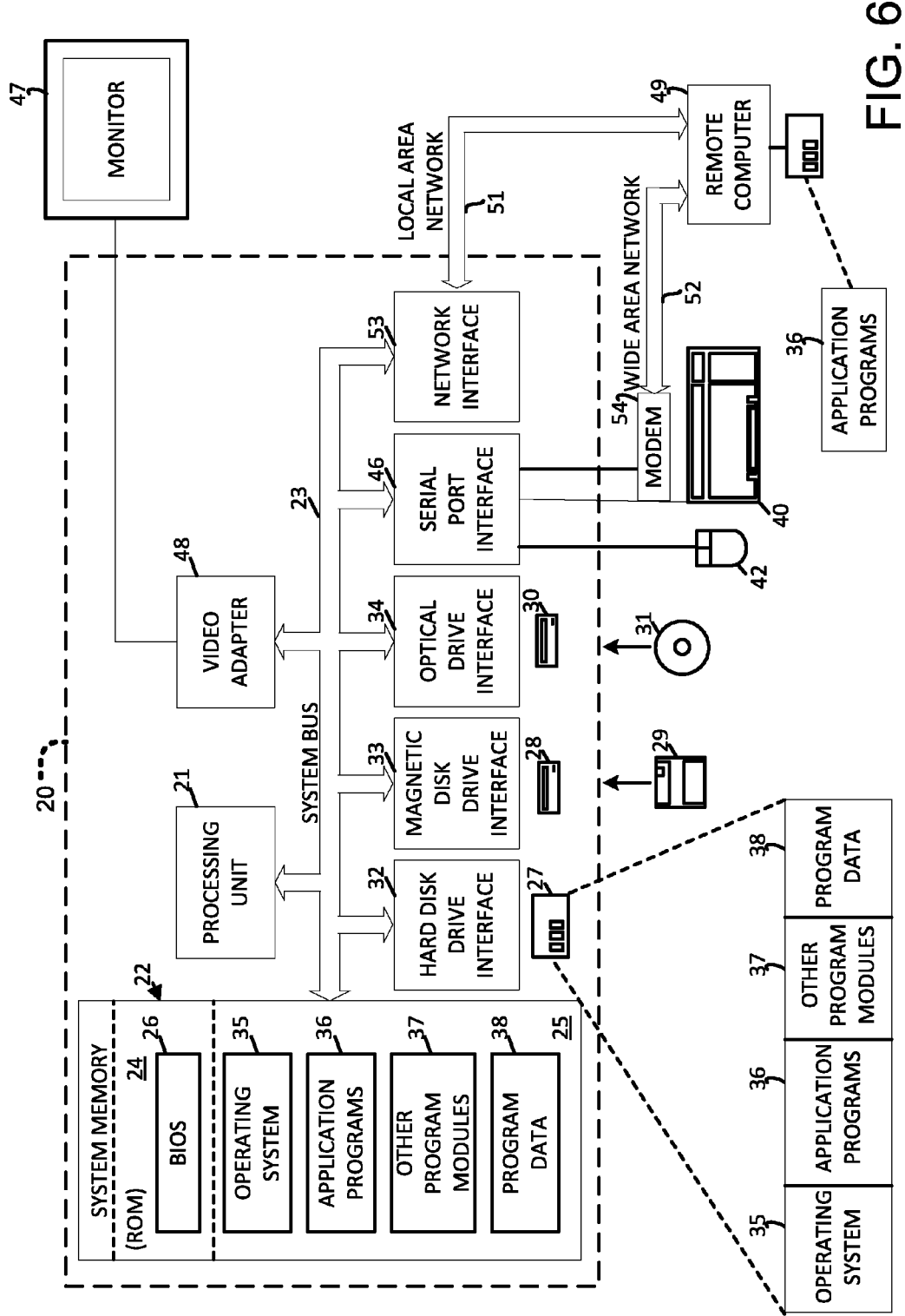
FIG. 6 illustrates an example system that may be useful in implementing the technology described herein.

FIG. 6 illustrates an example system that may be useful in implementing the technology described herein. FIG. 6 illustrates an example system that may be useful in implementing the described technology. The example hardware and operating environment of FIG. 6 for implementing the described technology includes a computing device, such as general purpose computing device in the form of a gaming console or computer 20, a mobile telephone, a personal data assistant (PDA), a set top box, or other type of computing device. In the implementation of FIG. 6, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated storage media provide nonvolatile storage of computer-readable instructions, data structures, program engines, and other data for the computer 20. It should be appreciated by those skilled in the art that any type of computer-readable storage media which can store data that is accessible by a computer, such as magnetic cassettes, flash memory cards, digital video disks, random access memories (RAMs), read only memories (ROMs), and the like, may be used in the example operating environment.

A number of program engines may be stored on the hard disk, magnetic disk 29, optical disk 31, ROM 24, or RAM 25, including an operating system 35, one or more application programs 36, other program engines 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 6. The logical connections depicted in FIG. 6 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, a graph definer, a graph trainer, a labeling engine, and other operators and services may be embodied by instructions stored in memory 22 and/or storage devices 29 or 31 and processed by the processing unit 21. Training data, parameter tables, unlabeled datasets, label results, and other data may be stored in memory 22 and/or storage devices 29 or 31 as persistent datastores. Operators and services may be implemented using a general-purpose computer and specialized software (such as a server executing service software), a special purpose computing system and specialized software (such as a mobile device or network appliance executing service software), or other computing configurations.

The embodiments of the invention described herein are implemented as logical steps in one or more computer systems. The logical operations of the present invention are implemented (1) as a sequence of processor-implemented steps executing in one or more computer systems and (2) as interconnected machine or circuit engines within one or more computer systems. The implementation is a matter of choice, dependent on the performance requirements of the computer system implementing the invention. Accordingly, the logical operations making up the embodiments of the invention described herein are referred to variously as operations, steps, objects, or engines. Furthermore, it should be understood that logical operations may be performed in any order, unless explicitly claimed otherwise or a specific order is inherently necessitated by the claim language.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
defining in processor-readable memory a factor graph including a factor graph model replicated for each variable node of a set of variable nodes, each variable node being informed by one or more factors in the factor graph model, each factor being implemented as a regression tree, at least one factor defining a relationship between at least two variable nodes in the set of variable nodes;
training structure and parameterization of regression trees of the factor graph using an objective function and training data having a plurality of datasets, each dataset having elements of at least one labeled property, wherein the training determines parameters of energy functions for leaf nodes of the regression trees; and
storing the factor graph as trained in the processor-readable memory.

2. The method of claim 1, further comprising:
executing the factor graph on a dataset having elements of at least one unlabeled property to determine a label for the at least one unlabeled property for each element.

3. The method of claim 2, wherein the executing of the factor graph on the dataset having the elements of the at least one unlabeled property comprises:
minimizing an energy function to determine the label for the at least one unlabeled property for each element.

4. The method of claim 1, wherein the training operation comprises:
optimizing a pseudolikelihood estimation to determine the parameters of the energy functions for the leaf nodes of the regression trees of the factor graph.

5. The method of claim 1, wherein the training operation comprises:
jointly determining the structure of the regression trees and the parameters of the energy functions for the leaf nodes of the regression trees.

6. The method of claim 1, further comprising:
determining a scope of each replicated factor graph model in the factor graph by selecting factors that minimize a pseudolikelihood computation for each factor.

7. The method of claim 1, wherein the dataset includes an image and the element of the dataset is a pixel in the image.

8. A labeling system, comprising:
a graph definer that defines a factor graph in processor-readable memory, the factor graph including a factor graph model replicated for each variable node of a set of variable nodes, each variable node being informed by one or more factors in the factor graph model, each factor being implemented as a regression tree; and
a graph trainer that trains structure and parameterization of regression trees of the factor graph using an objective function and training data having a plurality of datasets, each dataset having elements of at least one labeled property, wherein the graph trainer determines parameters of energy functions for leaf nodes of the regression trees.

9. The labeling system of claim 8, further comprising:
a labeling engine that executes the factor graph on a dataset having elements of at least one unlabeled property to determine a label for the at least one unlabeled property for each element.

10. The labeling system of claim 9, wherein the labeling engine minimizes an energy function to determine the label for the at least one unlabeled property for each element.

11. A computer-readable storage device comprising computer-executable instructions that, when executed by a processor, cause the processor to perform acts comprising:
defining in processor-readable memory a factor graph including a factor graph model replicated for each variable node of a set of variable nodes, each variable node being informed by one or more factors in the factor graph model, each factor being implemented as a regression tree; and
training structure and parameterization of regression trees of the factor graph using an objective function and training data having a plurality of datasets, each dataset having elements of at least one labeled property, wherein the training determines parameters of energy functions for leaf nodes of the regression trees.

12. The computer-readable storage device of claim 11, wherein at least one factor defining a relationship between at least two variable nodes.

13. The computer-readable storage device of claim 11, wherein the computer-executable instructions, when executed by the processor, further cause the processor to perform acts comprising:
executing the factor graph on a dataset having elements of at least one unlabeled property to determine a label for the at least one unlabeled property for each element.

14. The computer-readable storage device of claim 13, wherein the executing operation comprises:
minimizing an energy function to determine the label for the at least one unlabeled property for each element.

15. The computer-readable storage device of claim 11, wherein the training operation comprises:
optimizing a pseudolikelihood estimation to determine the parameters of the energy functions for the leaf nodes of the regression trees of the factor graph.

16. The computer-readable storage device of claim 11, wherein the training operation comprises:
jointly determining the structure of the regression trees and the parameters of the energy functions for the leaf nodes of the regression trees.

17. The computer-readable storage device of claim 11, wherein the computer-executable instructions, when executed by the processor, further cause the processor to perform acts comprising:
determining a scope of each replicated factor graph model in the factor graph by selecting factors that minimize a pseudolikelihood computation for each factor.

18. The method of claim 1, wherein the storing of the factor graph as trained in the processor-readable memory comprises:
storing the parameters of the energy functions for the leaf nodes of the regression trees in the processor-readable memory.

19. The computer-readable storage device of claim 11, wherein the computer-executable instructions, when executed by the processor, further cause the processor to perform acts comprising:
storing the parameters of the energy functions for the leaf nodes of the regression trees in the processor-readable memory.

* * * * *